United States Patent
Viernekes

(10) Patent No.: US 7,144,043 B2
(45) Date of Patent: Dec. 5, 2006

(54) SEAT BELT

(75) Inventor: Gerald Viernekes, Hassfurt (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 10/884,923

(22) Filed: Jul. 7, 2004

(65) Prior Publication Data

US 2004/0232689 A1    Nov. 25, 2004

Related U.S. Application Data

(63) Continuation of application No. PCT/DE03/00112, filed on Jan. 16, 2003.

(30) Foreign Application Priority Data

Jan. 18, 2002   (DE) ................................ 102 02 047

(51) Int. Cl.
    *B60R 22/36* (2006.01)
(52) U.S. Cl. ..................................................... 280/806
(58) Field of Classification Search ................ 280/805, 280/806, 807; 297/470
    See application file for complete search history.

(56) References Cited

U.S. PATENT DOCUMENTS

| | | | | | |
|---|---|---|---|---|---|
| 5,558,295 | A | * | 9/1996 | Bauer | 242/379.1 |
| 5,788,177 | A | * | 8/1998 | Keller et al. | 242/379.1 |
| 5,799,893 | A | * | 9/1998 | Miller et al. | 242/379.1 |
| 5,924,641 | A | * | 7/1999 | Keller et al. | 242/379.1 |
| 6,290,159 | B1 | * | 9/2001 | Specht et al. | 242/379.1 |
| 6,374,168 | B1 | * | 4/2002 | Fujii | 701/45 |
| 6,726,249 | B1 | * | 4/2004 | Yano et al. | 280/805 |

FOREIGN PATENT DOCUMENTS

| | | |
|---|---|---|
| DE | 43 02 042 C2 | 6/2000 |
| DE | 43 32 205 C2 | 6/2000 |
| EP | 0 858 935 B1 | 4/2002 |
| EP | 0 893 313 B1 | 1/2004 |

OTHER PUBLICATIONS

Derwent-Abstract; EP 0893313B1; Jan. 14, 2004; Breed Automotive Technology, Inc.; US-Lakeland, FL33807-3050, USA.
Derwent-Abstract; DE 43 32 205C2; Jun. 15, 2000; HS Technik und Design Technische Entwicklungen GmbH; D-82234 Weisslingen, Germany.
Derwent-Abstract; DE 43 02 042C2; Jun. 8, 2000; HS Technik und Design Technische Entwicklungen GmbH; D-82234 Weisslingen, Germany.

* cited by examiner

*Primary Examiner*—Faye M. Fleming
(74) *Attorney, Agent, or Firm*—Siemens AG

(57) ABSTRACT

The present invention relates to a seat belt including a function for ensuring a minimum tension, a function for taking up superfluous seat belt slack during a crash and a function for limiting a user friendly seat belt force that has an optimum effect on the person to be secured. The invention is characterized by an electric multifunction seat belt retractor including an electric drive device that is controlled in accordance with a control unit.

14 Claims, No Drawings

SEAT BELT

CROSS REFERENCE TO RELATED APPLICATIONS

The present application is a continuation of international application PCT/DE03/00112, filed Jan. 16, 2003, which designated the United States and further claims priority to German patent application 10202047.7, filed Jan. 18, 2003, the both of which are herein incorporated by reference.

BACKGROUND OF THE INVENTION

A number of components are responsible in known seat belt retraction mechanisms for ensuring that a modern seat belt is correctly positioned on its wearer in the event of a crash: A spring takes care of the necessary tensioning of the belt, an explosive charge takes up superfluous slack during a crash, a ratchet prevents further extension and a torsion bar limits the force of the belt to an acceptable level.

SUMMARY OF THE INVENTION

In accordance with the invention these tasks are handled by an electrical multi-functional seat belt retractor which features and intelligent controller allowing new options for greater safety and additional comfort.

BRIEF DESCRIPTION OF THE SEVERAL VIEWS OF THE DRAWINGS

No drawings are included with this application.

DETAILED DESCRIPTION OF THE INVENTION

If the control unit registers a crisis situation on the basis of data from ESP, ABS or the airbag control, the multi-fictional refractor tensions the belt within milliseconds. With the appropriate sensors and preferably a 42 Volt on-board network the multi-functional retractor can even pull the passengers into a safe position before a possible accident so that for example a front seat passenger who is tying their shoe laces at the time is not hit directly by the air bag. The new technology has major advantages during the first split seconds after the crash since in this phase the electrical multi-functional seat belt retractor explicitly varies the force of the belt: Large and heavy passengers are restrained more forcibly than light or small passengers. This ensures that each person in the vehicle falls into the airbag at just the right time and is thus afforded the greatest possible protection.

In accordance with one embodiment of the invention the trigger threshold of the electrical multi-functional seat belt retractor is set far lower than with conventional systems since the reaction is completely reversible. Even if there is a suspicion of impending danger the compete safety routine is therefore started and the belt is tensioned. If the accident is then avoided at the last moment, the electric motor of the multi-functional seat belt retractor simply releases the tension again.

The multi-functional seat belt retractor in accordance with the invention not only enhances safety, it also greatly increases the comfort in the vehicle. This allows individual comfort settings to be made which underscore the brand character of a vehicle without in any way compromising safety; In particular it is possible to retention the belt automatically and at regular intervals, depending on the temperature for example. A climate recorder deduces thick clothing at low temperatures and thereby higher tension required. Conversely in warm weather the passengers are released from a tight belt tension. And the relevant driving style can also be taken into account: The belt sits slightly more loosely on long and quiet parts of a journey whereas a more tightly tensioned belt supports the sporty driving feel during high-speed parts of a journey. Regardless of the comfort setting concerned, it only takes fractions of a second at critical moments to guarantee perfect protection.

I claim:

1. A seat belt system comprising:
   means for ensuring a minimum tension;
   means for taking up any superfluous seat belt slack during a crash;
   means for limiting a user-friendly maximum seat belt force exerted on a person to be secured; and
   an electric multi-functional seat belt retractor with an electrical drive device controlled by a control unit, the belt retractor comprising an electric motor arranged to facilitate the means for ensuring, means for taking, and means for limiting;
   wherein the retractor comprises a trigger function having a threshold set to cause a slackening of the belt in response to signals indicative of a non-dangerous vehicle operation, and
   wherein the means for taking up any superfluous seat belt slack operates in accordance with a mass or weight of a person to be secured by the seat belt.

2. The seat belt system according to claim 1, wherein the trigger function tensions the belt in response to signals indicating of a pending accident.

3. the seat belt system according to claim 2, wherein the trigger function relaxes the belt in response to signals indicating at least one of accident avoidance and accident completion.

4. The seat belt system according to claim 1, wherein the trigger function tensions the belt in response to signals indicating sporty driving.

5. The seat belt system according to claim 1, wherein the trigger function tensions the belt in response to signals indicating aggressive driving.

6. The seat belt system according to claim 1, wherein the non-dangerous vehicle operation is a journey vehicle operation.

7. The seat belt system according to claim 6, wherein the journey vehicle operation comprises at least one of extended and quiet vehicle operation.

8. A seat belt system comprising:
   means for ensuring a minimum tension;
   an electric multi-functional seat belt retractor with an electrical drive device controlled by a control unit, the belt retractor comprising an electric motor arranged to facilitate the means for ensuring, wherein the retractor comprises a trigger function having a threshold set to cause a slackening of the belt in response to signals indicative of a non-dangerous vehicle operation; and
   means for taking up any superfluous seat belt slack during a crash, wherein the means for taking is arranged to operate in accordance with a mass or weight of a person to be secured by the seat belt.

9. The seat belt system according to claim 8, wherein the trigger function tensions the belt in response to signals indicating a pending accident.

10. the seat belt system according to claim 9, wherein the trigger function relaxes the belt in response to at least one of accident avoidance and accident completion.

11. The seat belt system according to claim 8, wherein the trigger function tensions the belt in response to signals indicating sporty driving.

12. The seat belt system according to claim 8, wherein the trigger function tensions the belt in response to signals indicating aggressive driving.

13. The seat belt system according to claim 8, wherein the non-dangerous vehicle operation is a journey-vehicle operation.

14. The seat belt system according to claim 13, wherein the journey vehicle operation comprises at least one of extended and quiet vehicle operation.

* * * * *